United States Patent
Hata

(10) Patent No.: US 11,598,304 B2
(45) Date of Patent: Mar. 7, 2023

(54) IDLING-STOP CONTROL APPARATUS

(71) Applicant: SUBARU CORPORATION, Tokyo (JP)

(72) Inventor: Yuki Hata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/675,727

(22) Filed: Feb. 18, 2022

(65) Prior Publication Data

US 2022/0282693 A1    Sep. 8, 2022

(30) Foreign Application Priority Data

Mar. 8, 2021 (JP) .............................. JP2021-035959

(51) Int. Cl.
| | |
|---|---|
| *F02N 11/08* | (2006.01) |
| *F02D 29/06* | (2006.01) |
| *H02P 9/08* | (2006.01) |
| *H02P 101/25* | (2016.01) |

(52) U.S. Cl.
CPC .......... *F02N 11/0803* (2013.01); *F02D 29/06* (2013.01); *H02P 9/08* (2013.01); *F02N 2200/022* (2013.01); *F02N 2200/042* (2013.01); *H02P 2101/25* (2015.01)

(58) Field of Classification Search
CPC .. F02N 11/0803; F02N 11/0829; F09D 29/06; H02P 9/08; H02P 101/25; H02P 101/45
See application file for complete search history.

(56) References Cited

U.S. PATENT DOCUMENTS

| | | | | |
|---|---|---|---|---|
| 11,465,607 | B2 * | 10/2022 | Tsuruta | ................. B60W 20/13 |
| 2011/0146609 | A1 * | 6/2011 | Enoki | ................. F02N 11/0818 |
| | | | | 123/179.3 |
| 2014/0324263 | A1 * | 10/2014 | Tabata | .................. B60K 6/442 |
| | | | | 180/65.265 |
| 2018/0178806 | A1 * | 6/2018 | Nozaki | ................. B60W 50/14 |
| 2020/0091847 | A1 * | 3/2020 | Saito | ....................... F02D 29/02 |
| 2022/0324451 | A1 * | 10/2022 | Van Den Berg | ...... B60W 10/06 |

FOREIGN PATENT DOCUMENTS

JP         2000-329039 A       11/2000

\* cited by examiner

*Primary Examiner* — Sizo B Vilakazi
*Assistant Examiner* — Anthony L Bacon
(74) *Attorney, Agent, or Firm* — McDermott Will & Emery LLP

(57) ABSTRACT

An idling-stop control apparatus includes an idling-stop controller and an auxiliary-machine controller. The idling-stop controller is configured to automatically stop an engine to cause the engine to be in a state in which idling is stopped in a case where a predetermined condition for stopping idling is satisfied and configured to automatically restart the engine in a case where a predetermined condition for restarting the engine is satisfied. The auxiliary-machine controller is configured to control a drive state of an auxiliary machine that is to be driven by the engine. The auxiliary-machine controller is configured to control the drive state of the auxiliary machine that is driven by the engine such that, in a case where the engine is automatically restarted from the state in which idling is stopped by the idling-stop controller, a time differential value of an engine speed of the engine is constant.

7 Claims, 3 Drawing Sheets

IDLING-STOP CONTROL APPARATUS

CROSS-REFERENCE TO RELATED APPLICATIONS

The present application claims priority from Japanese Patent Application No. 2021-035959 filed on Mar. 8, 2021, the entire contents of which are hereby incorporated by reference.

BACKGROUND

The disclosure relates to an idling-stop control apparatus.

In recent years, a vehicle having an idling stop function (idling stop system) has been widely practically used, from the point of view of improving fuel economy of the vehicle and reducing exhaust gas. The idling stop function is configured to automatically stop an engine when, for example, the vehicle waits for a traffic light to change (when the vehicle is stopped) at an intersection. Upon detecting, for example, cancellation of stepping of a brake pedal when an engine is in a state in which idling is stopped, an idling stop system outputs a request for a restart of the engine, and the engine is restarted (refer to, for example, Japanese Unexamined Patent Application Publication No. 2000-329039).

SUMMARY

An aspect of the disclosure provides an idling-stop control apparatus. The idling-stop control apparatus includes an idling-stop controller and an auxiliary-machine controller. The idling-stop controller is configured to automatically stop an engine to cause the engine to be in a state in which idling is stopped in a case where a predetermined condition for stopping the idling is satisfied and configured to automatically restart the engine in a case where a predetermined condition for restarting the engine is satisfied. The auxiliary-machine controller is configured to control a drive state of an auxiliary machine that is to be driven by the engine. The auxiliary-machine controller is configured to control the drive state of the auxiliary machine such that, in a case where the engine is automatically restarted from the state in which the idling is stopped by the idling-stop controller, a time differential value of an engine speed of the engine is constant.

An aspect of the disclosure provides an idling-stop control apparatus. The idling-stop control apparatus includes circuitry. The circuitry is configured to automatically stop an engine to cause the engine to be in a state in which idling is stopped in a case where a predetermined condition for stopping the idling is satisfied and configured to automatically restart the engine in a case where a predetermined condition for restarting the engine is satisfied. The circuitry is configured to control a drive state of an auxiliary machine that is to be driven by the engine. The circuitry is configured to control the drive state of the auxiliary machine such that, upon automatically restarting the engine from the state in which the idling is stopped, a time differential value of an engine speed of the engine is constant.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

There is a case in which a vehicle body vibrates when an engine is automatically restarted (resumed) from a state in which idling is stopped and gives uncomfortable feeling (discomfort) to an occupant of the vehicle. Thus, vibration of a vehicle body is intended to be suppressed (reduced) when an engine is automatically restarted from a state in which idling is stopped.

It is desirable to provide an idling-stop control apparatus capable of suppressing vibration of a vehicle body when an engine is automatically restarted (resumed) from a state in which idling is stopped.

As a result of repeated keen examination, the inventor found that a variation in a differential value of an engine speed when an engine is automatically restarted from a state in which idling is stopped varies a force that acts in each of the lateral direction (y direction) and the height direction (z direction) of the engine (horizontally opposed engine) and causes an engine block to vibrate and lead to shaking of a vehicle body in, for example, an engine speed region in which the vibration of the engine block is a resonance point unique to the vehicle body.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
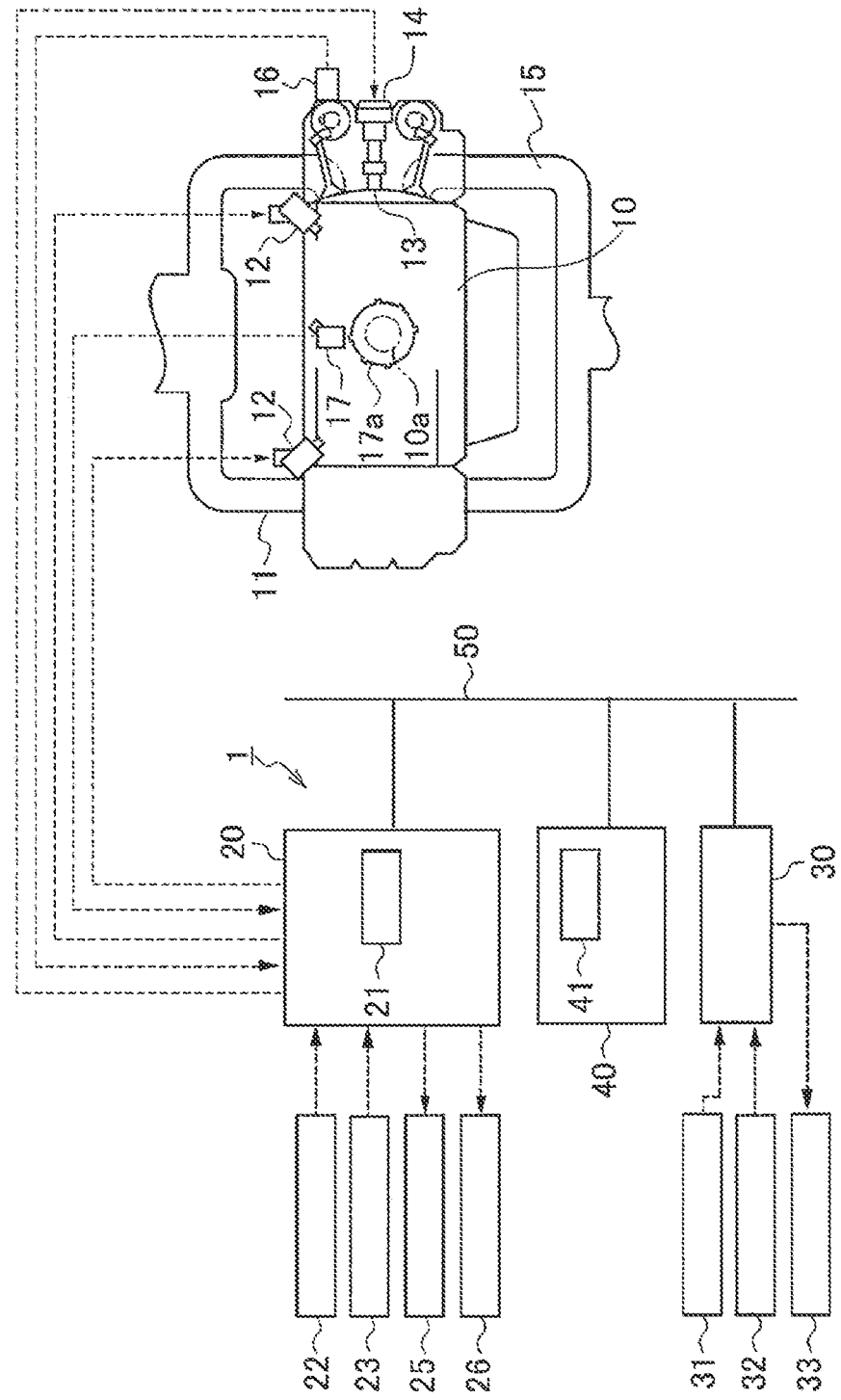
FIG. 1 is a block diagram illustrating a configuration of an idling-stop control apparatus according to an embodiment of the disclosure.

First, a configuration of an idling-stop control apparatus 1 according to the embodiment will be described with reference to FIG. 1. FIG. 1 is a block diagram illustrating a configuration of the idling-stop control apparatus 1.

The idling-stop control apparatus 1 is a device having an idling stop function that automatically stops an engine 10 when, for example, a vehicle is stopped temporarily to, for example, wait for a traffic light to change, and that automatically restarts, when the vehicle is to be started, the engine 10 upon detecting, for example, cancellation of stepping of a brake pedal by a driver. In one example, the idling-stop control apparatus 1 has a function that suppresses vibration of a vehicle body when an engine is automatically restarted (resumed) from a state in which idling is stopped. Details of the function will be described later.

The engine 10 is, for example, a horizontally opposed 4-cylinder gasoline engine. The engine 10 is a cylinder-injection engine that injects a fuel directly into a cylinder (the inside of a cylinder). In the engine 10, air that is sucked through an air cleaner is throttled by a throttle valve provided in an air intake pipe, passes through an intake manifold 11, and is sucked into each cylinder formed in the engine 10.

An injector 12 that injects a fuel into a cylinder is mounted to each cylinder of the engine 10. The injector 12 injects a fuel that is pressurized by a high-pressure fuel pump directly into a combustion chamber of each cylinder.

A spark plug 13 that ignites an air-fuel mixture, and a coil 14 that incorporates an igniter and that applies a high voltage to the spark plug 13 are mounted to a cylinder head of each cylinder. In each cylinder of the engine 10, an air-fuel mixture of sucked air and a fuel injected by the injector 12 is ignited by the spark plug 13 and burned. An exhaust gas after burning is discharged through an exhaust pipe 15.

A belt (not illustrated) that transmits a driving force is placed around a pulley that is mounted to one end portion of a crankshaft 10a of the engine 10. An alternator 25 (corresponding to a power generator in one example) is coupled in a drivable manner via the belt to the pulley. A driving force output from the engine 10 is transmitted to the alternator 25 via the belt and drives the alternator 25.

The alternator 25 generates power by being driven by the engine 10. The amount of power generation by the alternator 25 is controlled (regulated) by an engine control unit (hereinafter referred to as "ECU") 20, which will be described later, in accordance with, for example, an operation state (the magnitude of an electrical load) of an electric component (electric equipment).

The amount of power generation by the alternator 25 is controlled such that, when an engine is restarted from a state in which idling is stopped, a time differential value of an engine speed is constant (or substantially constant).

A cam angle sensor 16 for identifying cylinders of the engine 10 is mounted in the vicinity of a cam shaft of the engine 10. In addition, a crank angle sensor 17 that detects a rotational position of the crankshaft 10a is mounted in the vicinity of the crankshaft 10a of the engine 10. At an end portion of the crankshaft 10a, for example, a timing rotor 17a in which 34 pieces of projections with two missing pieces are formed at intervals of 10° is mounted. The crank angle sensor 17 detects the rotational position of the crankshaft 10a by detecting presence/absence of the projections of the timing rotor 17a.

These sensors are coupled to the ECU 20. An accelerator opening-degree sensor 22 that detects the amount of stepping (opening degree) of an accelerator pedal, a water-temperature sensor 23 that detects the temperature (water temperature) of cooling water, and the like are also coupled to the ECU 20. The ECU 20 is constituted by a microprocessor that performs an arithmetic operation, an EEPROM that stores a program and the like for causing the microprocessor to execute each processing, a RAM that stores various types of data including results of arithmetic operations, a backup RAM whose stored contents are maintained by a battery, an input-output I/F, and the like. The ECU 20 includes an injector driver that drives the injector 12, an output circuit that outputs an ignition signal, and the like. The ECU 20 further includes a circuit that varies the amount of power generation by the alternator 25, and the like.

The ECU 20 identifies a cylinder from an output from the cam angle sensor 16 and obtains the number of revolutions of an engine (engine speed) from an output from the crank angle sensor 17. On the basis of detection signals input from various types of sensors, the ECU 20 acquires various types of information including a sucked air amount, an intake manifold pressure, an accelerator-pedal opening degree, an air-fuel ratio of the air-fuel mixture, and a water temperature, an oil temperature, and the like in the engine 10. On the basis of these obtained various types of information, the ECU 20 controls the fuel injection amount, the ignition timing, and various types of devices to thereby control the engine 10 comprehensively.

The ECU 20 is coupled to a vehicle dynamic control unit (hereinafter referred to as "VDCU") 30, an idling-stop control unit (hereinafter referred to as "ISCU") 40, and the like through, for example, an in-vehicle communication line 50, such as a controller area network (CAN) or the like, to be able to communicate with each other. The ECU 20 transmits acquired information on the number of revolutions (engine speed) and the like to the ISCU 40 via the CAN 50.

A brake fluid pressure sensor 31 that detects the pressure (brake fluid pressure (oil pressure)) of a master cylinder of a brake actuator 33, an acceleration sensor 32 that detects acceleration in the front-rear and left-right directions, and the like are coupled to the VDCU 30. The brake fluid pressure sensor 31 is configured to detect a brake fluid pressure that is based on a braking operation performed by a driver and that serves as an index value indicating the magnitude (the strength of a brake) of a braking force that brakes a vehicle. The VDCU brakes a vehicle by driving the brake actuator 33 in accordance with the amount of operation with respect to a brake pedal and ensures stability of the vehicle at the time of turning by detecting the behavior of the vehicle by various types of sensors (for example, a wheel speed sensor, a steering angle sensor, an acceleration sensor, a yaw rate sensor, etc.) and suppressing skidding through brake control by automatic pressurization and torque control of the engine 10. The VDCU 30 transmits detected braking information (brake information) including the pressure of the master cylinder (brake fluid pressure) to the ISCU 40 via the CAN 50.

To improve fuel economy and reduce discharged emission, the ISCU 40 outputs a signal for requesting a stop of an engine when a predetermined condition for stopping idling is satisfied to the ECU 20 via the CAN 50 and automatically stops the engine 10. Thereafter, when a predetermined condition for cancelling a stop of idling is satisfied, the ISCU 40 outputs a signal for requesting a restart of an engine to the ECU 20 via the CAN 50 and restarts the engine 10. Instead of the ISCU 40, a transmission control unit (TCU) may have an idling stop function.

For example, when a situation in which a brake pedal is stepped (in other words, a brake fluid pressure is larger than a brake fluid pressure for allowing a restart (a threshold for allowing a restart)), a situation in which the speed of a vehicle is zero, and/or a situation in which the shift position is in the D (drive) range or the N (neutral) range, or the like is established, the ISCU 40 transmits a signal for requesting a stop of an engine to the ECU 20 via the CAN 50 and stops fuel injection and ignition for the engine 10, thereby stopping the engine 10 to stop idling. The ISCU 40 transmits a signal for requesting a restart of an engine to the ECU 20 via the CAN 50 to restart the engine 10 when, for example, stepping of the brake pedal is cancelled (in other words, when the brake fluid pressure becomes lower than or equal to the brake fluid pressure for allowing a restart) and/or when the shift position is in the P (parking) range or the R (reverse) range.

Therefore, the ISCU 40 includes an idling-stop control unit 41 functionally. The ISCU 40 is constituted by a microprocessor that performs an arithmetic operation, an EEPROM that stores a program and the like for causing the microprocessor to execute each processing, a RAM that stores various types of data including results of arithmetic operations, a backup RAM whose stored contents are maintained by a battery, an input-output I/F, and the like. The ISCU 40 implements a function of the idling-stop control unit 41 in response to a program stored in the EEPROM being executed by the microprocessor.

The idling-stop control unit 41 outputs an engine restart request signal for requesting a restart of the engine 10 to the ECU 20 when stepping of the brake pedal is started to be cancelled during an idling stop and when the brake fluid pressure becomes less than or equal to the brake fluid pressure for allowing a restart.

The ECU 20 restarts the engine 10 upon receiving an engine restart request signal from the ISCU 40. In other words, the ECU 20 starts cranking of the engine 10 by, for example, starting a starter motor 26 (corresponding to a starter in one example).

Then, a fuel is injected by driving the injector 12 at a predetermined fuel injection timing, and thereafter, the engine is restarted by igniting a mixture of air and a fuel at a predetermined ignition timing. In one embodiment, the idling-stop control unit 41 and the ECU 20 may serve as an "idling-stop controller".

For example, the ECU 20 has a function of suppressing vibration of a vehicle body when an engine is automatically restarted from a state in which idling is stopped.

Therefore, the ECU 20 includes an auxiliary-machine control unit 21 functionally. The ECU 20 implements a function of the auxiliary-machine control unit 21 in response to a program stored in the EEPROM or the like being executed by the microprocessor.

The auxiliary-machine control unit 21 controls the drive state (the amount of power generation) of the alternator 25 (auxiliary machine) driven by the engine 10. In one embodiment, the auxiliary-machine control unit 21 serve as an "auxiliary-machine controller". For example, the auxiliary-machine control unit 21 controls the drive state (the amount of power generation) of the alternator 25 driven by the engine 10 such that, when the engine 10 is automatically restarted from a state in which idling is stopped, the time differential value of an engine speed is constant (in other words, such that a variation in a force that acts in each of the lateral direction (y direction) and the height direction (z direction) of the engine 10 is suppressed).

The force that acts in the y direction is represented by the following equation (1).

$$\text{Force acting in } y \text{ direction} \propto m \times r_y \times (d\omega_e/dt) \quad (1)$$

The force that acts in the z direction is represented by the following equation (2).

$$\text{Force acting in } z \text{ direction} \propto m \times r_z \times (d\omega_e/dt) \quad (2)$$

Note that m is the mass [kg] of the crankshaft 10a, ry is the dynamic radius [m] of the crankshaft in the y-axis direction, rz is the dynamic radius [m] of the crankshaft in the z-axis direction, and $\omega_e$ is the engine speed [rpm].

Figure 3:
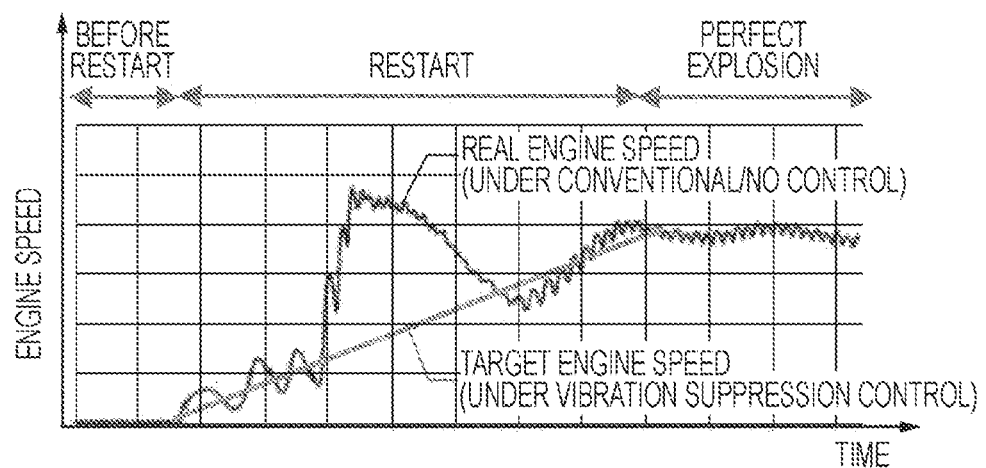
FIG. 3 is a graph illustrating a relationship between a target engine speed (under vibration suppression control) and a conventional real engine speed (under no control) when an engine is restarted.

The auxiliary-machine control unit 21 sets a target engine speed ($\omega_e$ target) such that, when the engine 10 is restarted (in a region in which the engine speed is increasing), the time differential value of the engine speed is constant, as illustrated in FIG. 3. When an actual engine speed (real engine speed) is higher than the target engine speed, the auxiliary-machine control unit 21 increases the amount of power generation (in other words, a load) of the alternator 25 such that the time differential value of the engine speed is constant. When the time differential value of the engine speed is constant, the magnitude (the size of an inclination) thereof may not be considered. The target engine speed is previously set such that, for example, 0 rpm (during an idling stop) and the number of idling revolutions (for example, 600 rpm) after perfect explosion are continuous.

At this time, the auxiliary-machine control unit 21 calculates the target amount of power generation by the alternator 25 on the basis of a torque of the engine 10, a torque of the starter motor 26 that performs cranking of the engine 10, friction (resistance) that acts on the engine 10, and a value obtained by multiplying inertia of the crankshaft 10a of the engine 10 by a time differential value of the target engine speed.

At the time of an engine restart, the following equation (3) of a rotational motion is established on the crankshaft 10a of the engine.

$$I \times (d\omega_e/dt) = T_{engine} + T_{starter} - T_{friction} + T_{alternater} \quad (3)$$

I is inertia [kg*m^2] of an engine crankshaft.
$T_{engine}$ is an engine torque [Nm].
$T_{starter}$ is a starter torque [Nm].
$T_{friction}$ is a friction torque [Nm].
$T_{alternater}$ is an alternator power generation torque [Nm].

Here, in a region in which a real engine speed is higher than the target engine speed, the alternator 25 is caused to generate power (generate $T_{alternater}$ (<0 [Nm])) such that the differential value ($d\omega_e/dt$) of the engine speed is constant, thereby reducing an overshoot (in other words, a variation in the force) of the engine speed.

In one example, the auxiliary-machine control unit 21 obtains a power generation torque $T_{alternater}$ instruction (target power-generation torque=target power-generation amount) to be given to the alternator 25, on the basis of the following equation (4).

$$T_{alternater} \text{ instruction} = \min(-T_{engine} - T_{starter} + T_{friction} + I \times (d\omega_e \text{ target}/dt), 0 \text{ [Nm]}) \quad (4)$$

In other words, as the $T_{alternater}$ instruction (target power-generation torque=target power-generation amount), the auxiliary-machine control unit 21 uses, between ($-T_{engine} - T_{starter} + T_{friction}$ I×($d\omega_e$ target/dt)) and zero, a value that is smaller. The auxiliary-machine control unit 21 then gives a magnetic field current instruction (=target power-generation amount) in accordance with $T_{alternater}$ to the alternator 25.

At this time, the auxiliary-machine control unit 21 obtains $T_{engine}$ (a torque of the engine 10) on the basis of, for example, a sucked air amount (g/s) of the engine 10, or a throttle valve opening degree and an engine speed.

The auxiliary-machine control unit 21 also obtains $T_{starter}$ (a torque of the starter motor 26) on the basis of, for example, an engine speed. For example, a map (starter torque map) in which a relation between an engine speed and $T_{starter}$ (a torque of the starter motor 26) is specified is stored in the EEPROM of the ECU 20, or the like. The starter torque map is searched on the basis of an engine speed to obtain $T_{starter}$ (a torque of the starter motor 26). In the starter torque map, a map value (a torque of the starter motor 26) is set to 0 [Nm] at a predetermined engine speed (in a region after an initial explosion) or more.

Similarly, the auxiliary-machine control unit 21 obtains $T_{friction}$ (friction that acts on the engine 10) on the basis of, for example, an engine speed, and a water temperature or an oil temperature. For example, a map (friction map) in which a relation of an engine speed, and a water temperature or an oil temperature to $T_{friction}$ (friction that acts on the engine 10) is specified is stored in the EEPROM of the ECU 20, or the like. The friction map is searched on the basis of an engine speed, and a water temperature or an oil temperature to obtain $T_{friction}$ (friction that acts on the engine 10). $T_{friction}$ (friction that acts on the engine 10) may be simply obtained on the basis of an engine speed. Examples of friction that acts on the engine 10 are friction (resistance) of a transmission, a compressor, and the like.

As a result, an overshoot of the engine speed is suppressed, and vibration of the engine 10 is suppressed (reduced). The alternator 25 is not able to generate a torque (a torque larger than zero) on the driving side and thus is not able to perform control such that a real engine speed is increased in a region in which the real engine speed is lower than a target engine speed.

When the engine speed becomes more than or equal to a predetermined speed (for example, 600 rpm) (in other words, when it is determined that a perfect explosion has occurred in the engine 10), the auxiliary-machine control unit 21 ends the above-described control (vibration suppression control) of the drive state (power generation amount) of the alternator 25 such that the time differential value of the engine speed is constant.

Figure 2:
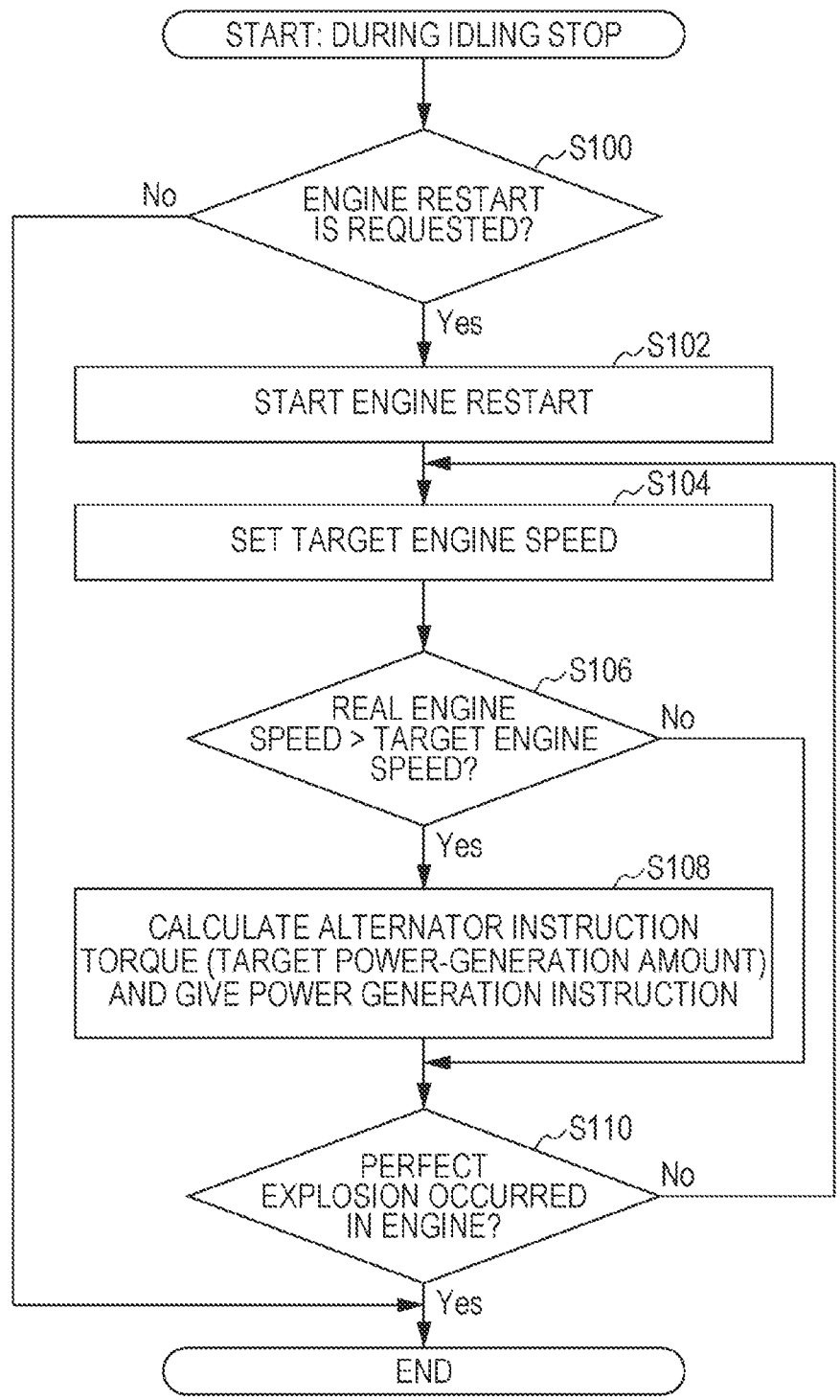
FIG. 2 is a flow chart illustrating processes of engine restart processing (vibration suppression control) performed by an idling-stop control apparatus according to the embodiment.

Next, with reference to FIG. 2, an operation of the idling-stop control apparatus 1 will be described. FIG. 2 is a flow chart illustrating processes of engine restart processing (vibration suppression control) performed by the idling-stop control apparatus 1. This processing is repeatedly executed at every predetermined time, for example, in the ECU 20.

In a step S100, whether an engine restart request for requesting a restart of the engine 10 (in other words, whether a condition for a restart from a state in which idling is stopped is satisfied) is received during an idling stop (while the engine is automatically stopped) is determined. When an engine restart request for requesting a restart of the engine 10 is not received, this processing is once cancelled, and the state in which idling is stopped is continued. When an engine restart request for requesting a restart of the engine 10 is received, the processing proceeds to a step S102.

In the step S102, a restart of the engine 10 is started. In other words, the starter motor 26 is started, and cranking of the engine 10 is started. Then, the injector 12 is driven at a predetermined fuel injection timing and injects a fuel. Thereafter, a mixture of air and a fuel is ignited at a predetermined ignition timing, thereby starting the restart of the engine 10.

Next, in a step S104, a target engine speed is set such that the time differential value of the engine speed is constant. The method of setting a target engine speed is as described above, and detailed description thereof is thus omitted here.

Next, in a step S106, whether an actual engine speed (real engine speed) is higher than the target engine speed is determined. When the real engine speed is lower than or equal to the target engine speed, the processing proceeds to a step S110. When the real engine speed is higher than the target engine speed, the processing proceeds to a step S108.

In the step S108, a target amount of power generation by the alternator 25 is obtained, and the drive state of the alternator 25 is controlled such that the amount of power generation by the alternator 25 coincides with the target amount of power generation. In other words, the drive state (power generation amount) of the alternator 25 is controlled such that the time differential value of the engine speed is constant. The method of obtaining a target amount of power generation by the alternator 25 is as described above, and detailed description thereof is thus omitted here.

In the step S110, whether the engine speed is more than or equal to a predetermined speed (for example, 600 rpm) is determined. When the engine speed is less than the predetermined speed, the processing proceeds to a step S104, and the processing in the above-described steps S104 to S110 is repeatedly executed until the engine speed becomes more than or equal to the predetermined speed. When the engine speed is more than or equal to the predetermined speed (in other words, when it is determined that a perfect explosion has occurred in the engine), this processing is ended, and this processing is cancelled.

As described above, according to the present embodiment, a target engine speed is set such that the time differential value of an engine speed is constant when the engine 10 is automatically restarted from a state in which idling is stopped, and the amount of power generation by the alternator 25 driven by the engine 10 is increased such that the time differential value of the engine speed is constant when an actual engine speed is higher than the target engine speed. In other words, the amount of power generation by the alternator 25 is increased (a load is increased) to adjust the time differential value of the engine speed to be constant. As a result, vibration of the engine when the engine is automatically restarted (resumed) from a state in which idling is stopped is suppressed, and vibration of the vehicle body is suppressed.

According to the present embodiment, the target engine speed of the alternator 25 is calculated on the basis of a torque of the engine 10, a torque of the starter motor 26 that performs cranking of the engine 10, friction (resistance) that acts on the engine 10, and a value obtained by multiplying inertia of the crankshaft 10a of the engine 10 by the time differential value of the target engine speed. The target amount of power generation by the alternator 25 thus may be specified desirably such that the time differential value of the engine speed is constant.

According to the present embodiment, the torque of the starter motor 26 is obtained on the basis of the engine speed. The torque of the starter motor 26 thus may be obtained (estimated) with accuracy.

Similarly, according to the present embodiment, friction that acts on the engine 10 is obtained on the basis of an engine speed, and a water temperature or an oil temperature. The friction that acts on the engine thus may be obtained (estimated) with accuracy.

According to the present embodiment, control (vibration suppression control) of the drive state (power generation amount) of the alternator 25 such that the time differential value of the engine speed is constant is ended when the engine speed becomes more than or equal to a predetermined speed (in other words, when it is determined that a perfect explosion has occurred in the engine 10). The aforementioned control (vibration suppression control) thus may be ended at a desirable timing.

An embodiment of the disclosure has been described above. The disclosure is, however, not limited to the aforementioned embodiment and can be variously modified. For example, although the aforementioned embodiment, in which the disclosure is applied to a gasoline engine vehicle, has been described as an example, the disclosure is also applicable to vehicles having a driving force source other than a gasoline engine, for example, to a hybrid vehicle (HEV) and the like including an engine and motor generators (MG) as a driving force source. In one embodiment, one motor generator (MG) may serve as a "power generator", and the other motor generator (MG) may serve as a "starter".

In the aforementioned embodiment, the drive state (power generation amount) of the alternator 25 is controlled by the engine 10 such that the time differential value of the engine speed is constant. However, the drive state (the state of a load) of, instead of the alternator 25, another auxiliary machine that is driven by the engine 10 may be controlled.

The system configuration of the aforementioned embodiment is one example, and the system configuration according to the disclosure is not limited to the above embodiment. For example, the ECU 20 and the ISCU 40 may be integrated into one unit. In addition, instead of the ISCU 40, a transmission control unit (TCU) may have an idling stop function.

The ECU 20, the ISCU 40, and the auxiliary-machine control unit 21 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 20, the ISCU 40, and the auxiliary-machine control unit 21 illustrated in FIG. 1.

Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 20, the ISCU 40, and the auxiliary-machine control unit 21 illustrated in FIG. 1.

The invention claimed is:

1. An idling-stop control apparatus comprising:
   an idling-stop controller configured to automatically stop an engine to cause the engine to be in a state in which idling is stopped in a case where a predetermined condition for stopping the idling is satisfied and configured to automatically restart the engine in a case where a predetermined condition for restarting the engine is satisfied; and
   an auxiliary-machine controller configured to control a drive state of an auxiliary machine to be driven by the engine,
   wherein the auxiliary-machine controller is configured to control the drive state of the auxiliary machine such that, in a case where the engine is automatically restarted from the state in which the idling is stopped by the idling-stop controller, a time differential value of an engine speed of the engine is constant.

2. The idling-stop control apparatus according to claim 1, wherein the auxiliary machine is a power generator, and wherein the auxiliary-machine controller is configured to set a target engine speed of the engine such that, in the case where the engine is automatically restarted from the state in which idling is stopped by the idling-stop controller, the time differential value of the engine speed is constant, and configured to increase, in a case where an actual engine speed of the engine is higher than the target engine speed, an amount of power generation by the power generator such that the time differential value of the engine speed is constant.

3. The idling-stop control apparatus according to claim 2, wherein the auxiliary-machine controller is configured to calculate a target amount of the power generation by the power generator based on a torque of the engine, a torque of a starter configured to perform cranking of the engine, friction that is to act on the engine, and a value to be obtained by multiplying inertia of a crankshaft of the engine by a time differential value of the target engine speed.

4. The idling-stop control apparatus according to claim 3, wherein the auxiliary-machine controller is configured to obtain the torque of the starter based on the engine speed.

5. The idling-stop control apparatus according to claim 3, wherein the auxiliary-machine controller is configured to obtain the friction based on the engine speed.

6. The idling-stop control apparatus according to claim 4, wherein the auxiliary-machine controller is configured to obtain the friction based on the engine speed.

7. An idling-stop control apparatus comprising circuitry configured to
   automatically stop an engine to cause the engine to be in a state in which idling is stopped in a case where a predetermined condition for stopping the idling is satisfied and configured to automatically restart the engine in a case where a predetermined condition for restarting the engine is satisfied, and
   control a drive state of an auxiliary machine to be driven by the engine, and
   control the drive state of the auxiliary machine such that, upon automatically restarting the engine from the state in which the idling is stopped, a time differential value of an engine speed of the engine is constant.

* * * * *